Oct. 7, 1941. W. C. KRAPP 2,257,966
GUARD SUPPORT FOR OPHTHALMIC MOUNTINGS
Filed Sept. 14, 1939
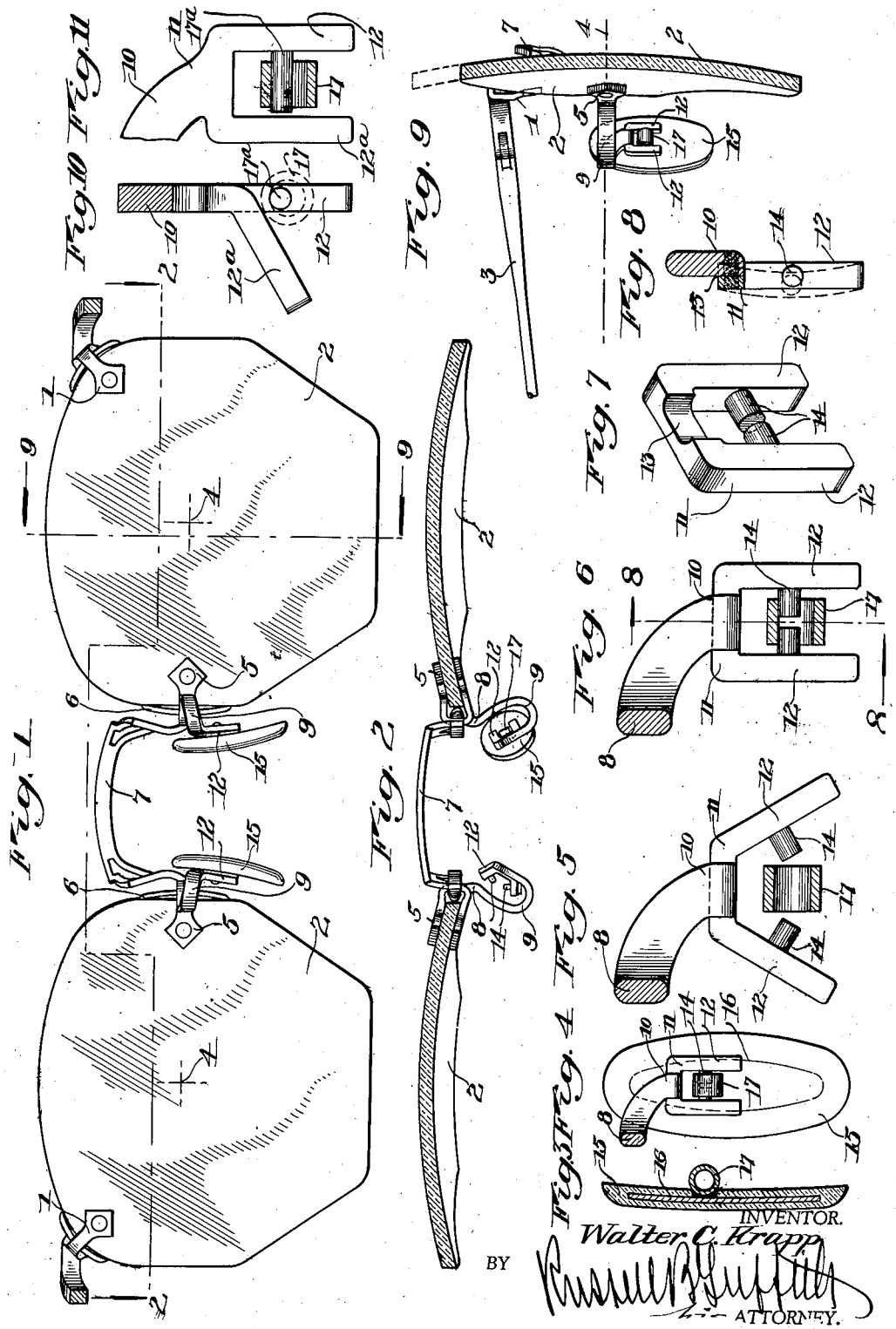
INVENTOR.
Walter C. Krapp
BY
ATTORNEY.

Patented Oct. 7, 1941

2,257,966

UNITED STATES PATENT OFFICE 2,257,966

GUARD SUPPORT FOR OPHTHALMIC MOUNTINGS

Walter C. Krapp, Rochester, N. Y., assignor to Shuron Optical Company, Inc., Rochester, N. Y., a corporation of New York Application September 14, 1939, Serial No. 294,880

2 Claims. (Cl. 88—49)

My present invention relates to optics and more particularly to ophthalmic mountings, and it has for its general object to provide an eye glass of this character, which to the advantage of the wearer and the convenience of the practitioner is so constructed that the guards or nose pads can be perfectly adjusted with reference to the saddling of such nose pads or guards upon the nose to give a maximum optical efficiency. The improvements are directed in part to saddling ophthalmic mountings whose optical centers do not agree with the geometrical outlines thereof in such way that the final adjusted mounting will be optically perfect. In other words, the idea is to provide guards with nose pads that will support the eye glass lenses on proper centers, and at the same time preserve the desired outward appearances. The improvements are further directed to a specific arrangement for the pivotal mounting of the guard or pad on the arm that has certain manufacturing advantages, including that of assembly, and further advantage of promoting ease in the attachment and detachment of the guards or nose pads for purposes of repair or substitution.

To these and other ends, the invention resides in certain improvements and combinations of parts, all as will be hereinafter more fully described, the novel features being pointed out in the claims at the end of this specification.

In the drawing:

Figure 1 is a front elevation of an ophthalmic mounting constructed in accordance with and illustrating one embodiment of my invention;

Figure 2 is a top plan view thereof with respect to the bridge and nose contacts except that it is taken on the horizontal section through the lenses on line 2—2 of Figure 1;

Figure 3 is an enlarged longitudinal section through the nose pad itself in detail;

Figure 4 is a view on the same scale in section through the guard arm but showing the nose pad assembled from the opposite side of the nasal wall;

Figure 5 is a side enlarged view of the manner in which such pad is assembled with the guard arm and the pivot thereof, the arm being shown spread for preliminary purposes;

Figure 6 is a view corresponding to that of Figure 5 and on the same scale but showing the nose pad pivotally locked on the guard arm for ultimate use;

Figure 7 is a perspective view on the scale of Figures 5 and 6 showing a detail of the guard arm pintle construction for the mounting of the nose pad;

Figure 8 is a section on the line 8—8 of Figure 6;

Figure 9 is a section through a lens of the mounting showing the guard arm and nose pad in side elevation on the line 9—9 of Figure 1;

Figure 10 is a detail section on the scale of Figures 5 to 8 showing a modified construction of the mounting of the nose pad on the guard arm, and Figure 11 is a side view corresponding to that of Figure 6 of the same modification of Figure 10.

Similar reference numerals throughout the several views indicate the same parts.

In the construction of ophthalmic mountings of the type illustrated it is recent practice to attach by means of lens connections 1 to the lenses 2, hinged temples 3 that go back to the ears of the wearer and proceed from an elevated point of attachment on the said lenses as indicated in Figures 1 and 9. This is for the general purpose of giving wide lateral vision without obstruction by the temples. Also, in this type of mounting the optical centers of the lenses often do not coincide with the geometrical centers thereof being higher than the latter as indicated at 4 in Figure 1. The net result of this is that the mounting, otherwise suitable, must be raised in its saddling upon the nose. In other words, the guards or nose pads must be dropped below the usual position with respect to the lens connections. With the present invention this is accomplished in connection with a novel pivotal mounting of the guards upon the guard arms.

Referring further more particularly to the drawings, 5 indicates the lens straps, 6 the edge straps, and 7 the bridge of an eyeglass mounting. Each guard arm 8 proceeds from a point intermediate of these rearwardly and outwardly and horizontally, is thence looped at 9, which aids in the usual pliable adjustments and such arm thence proceeds forwardly and downwardly to an ultimate substantially vertical position at 10. It thereupon terminates in a bifurcation constituted in the present instance by a yoke 11 having the parallel separated arms 12. For advantage in manufacture this yoke 11, in the present embodiment, is a separate piece of material formed with a central saddle 13 in its connecting portion, in which the guard arm having the cross section indicated is seated and then soldered or welded in a fused integral joint.

In the form of the invention illustrated, particularly in Figures 4 to 8, the arms 12 of the yoke or bifurcation 11 of the guard arm as a whole jointly carry a transverse pintle 14. In that embodiment the pintle is discontinuous being divided into two parts, one of which is carried on each arm. Turning on this pintle is the guard or nose pad 15 which includes a metallic core 16 to which is affixed to project from the outer or counternasal side a tubular knuckle 17. By this means the guard adjusts itself to the tapering conformation of the nose and by the adjustability of the arm 8 and loop 9 in general it is carried toward and from it.

A feature of the invention resides in the assembly of this guard and supporting arm combination. The yoke 11, in the original attachment of the guard arm has its own arms 12 spread as in Figure 5 so that the pintle elements 14 are separated. To apply the guard, all that is required is to insert its knuckle 17 within the yoke as indicated in the same figure, pinch the arms 12 together and the assembly is complete. The arms being of a pliable nature consistent with ultimate rigidity so far as the secure application of the guard is concerned, it is obvious that for purposes of cleaning, substitution or repair the arms may be spread apart from the position of Figure 6 to that of Figure 5 to release the guard knuckle and subsequently restore it.

In the modification shown in Figures 10 and 11 the pintle indicated at 17a is continuous and carried solely by one of the arms 12. In this form the opposite arm 12a is distorted laterally with reference to the plane of the yoked bifurcation as indicated in Figure 10 to permit application and removal of the guard knuckle 17, it not being feasible in this instance to spread the arms 12 and 12a in the former manner sufficiently to provide clearance for slipping the knuckle over the single or continuous pintle.

In both embodiments of the invention a feature of extending the arms 12 downwardly beyond the pintle is to control the amplitude of the rocking movement of the guard. By dishing the yoke or bifurcation 11 as indicated in dotted lines in Figure 8 to a greater or less degree, such rocking movement can be controlled with the knuckle 17 still close to the outer surface of the guard and nose pad 15, as shown in Figure 3.

A collateral advantage of the principal of construction herein involved is that in both original manufacture and assembly and for repair or disassembling purposes a spanner or special tool is provided to engage in manipulating the arms 12 between the positions of Figures 5 and 6.

I claim as my invention:

1. In an ophthalmic mounting, the combination with a guard arm having a vertically disposed portion terminating in a bifurcation to form a downwardly opening yoke comprising a pair of separate parallel arms of uniform width and pliability, said arms being provided with a transverse substantially horizontal pintle, and a guard having a knuckle turning loosely substantially vertically on the pintle, the pintle being discontinuous and partially fixed to both arms so that the knuckle may be attached and removed by spreading both arms.

2. In an ophthalmic mounting, the combination with a pair of side arms of substantially equal width and pliability connected by a yoke portion and having a supporting guard arm connected thereto centrally symmetrically of the yoke portions, one of the side arms at an intermediate point being provided with a transverse pintle extending toward the other in the plane of both arms, of a guard having a knuckle turning loosely on the pintle to be released and secured by the spreading and contraction of the arms from and toward each other, respectively.

WALTER C. KRAPP.